June 3, 1952   L. H. COHEN   2,599,433
APPARATUS FOR RETREADING RUBBER TIRES
Filed July 9, 1947   3 Sheets-Sheet 1

INVENTOR
LEZIR HYMAN COHEN
BY
Robert E. Burns
ATTORNEY.

INVENTOR
LEZIR HYMAN COHEN
BY
Robert E Burns
ATTORNEY.

June 3, 1952   L. H. COHEN   2,599,433
APPARATUS FOR RETREADING RUBBER TIRES
Filed July 9, 1947   3 Sheets-Sheet 3

INVENTOR
LEZIR HYMAN COHEN
BY
Robert E. Burns
ATTORNEY.

Patented June 3, 1952

2,599,433

UNITED STATES PATENT OFFICE 2,599,433

APPARATUS FOR RETREADING RUBBER TIRES

Lezer Heyman Cohen, Amsterdam, Netherlands

Application July 9, 1947, Serial No. 759,855
In the Netherlands August 13, 1946

8 Claims. (Cl. 18—18)

This invention relates to an apparatus for retreading rubber tires, especially motor car or motor cycle tires.

Apparatuses for providing motor-tires with a new tread are known wherein the tire to be retreaded is enclosed in a ring formed from an elastic metal plate, heated by means of flexible heating units. In one known apparatus a flexible mold is used, which is divided at one point and provided with enclosing serpentine heating units which, by means of a clamping mechanism, can be tightened around a tire of a given diameter and can be adapted to other tire diameters by special means.

An object of the invention is to provide a less complicated and more stable apparatus with which a more accurate finish and a quicker operation may be achieved than is possible with the apparatus hitherto used.

Apart from the construction, which is often rather impractical, all retreading apparatuses hitherto used have the serious drawback that in each apparatus only one tire at a time can be provided with a new tread. It is obvious that to obtain satisfactory production each retreading plant must have at its disposal a plurality of such apparatuses.

A further object of the invention is to obviate this drawback of prior devices.

The present invention is characterized by a device in which a heating chamber is formed by a hollow closed metallic hoop placed around the tire to be retreaded, and in which a plurality of profiled segments are conveniently arranged against the inner circumference of this hoop and together form a closed ring.

In this way, a unitary construction is obtained which has no loose parts.

The air which escapes during the vulcanizing process finds ample opportunity to flow away between the partitions of the profile elements, which contributes to the achievement of an accurately finished tread.

The heating chamber which can be utilized for either steam heating or electrical heating, can be constructed in a simple way out of a thin ring-shaped plate against which a second similar ring-shaped thin plate is welded in such a way that a hollow body with a box-shaped cross section is obtained.

In the preferred embodiment of the invention, the width of the segments, which preferably are formed of cast aluminum, corresponds to the width of the tire to be retreaded, the inner circumference of the segments being provided with an anti-slip tread-design, while the raised side edges, which are likewise profiled at their interior, provide a seal against the flowing off of plastic rubber during the vulcanizing process.

A special anti-slip tread-design will check slipping better than longitudinal grooves and, moreover, the thus obtained tread possesses a neat appearance.

By profiling in this manner, the air which, during the vulcanizing process is enclosed between the profiled segments and the soft rubber, has a better means of escape along the profiles and through the cross-seams at the contact surfaces of two adjacent elements, so that a true rubber tread is obtained which does not show any blemishes. Further, the apparatus is preferably of such construction that a plurality of tires can be retreaded in one single process, which means an increased output per apparatus and a reduction of the number of apparatuses required for a given production rate.

The invention will be more fully described with reference to the accompanying drawing, in which Fig. 1 shows a longitudinal section of an apparatus according to the invention.

Fig. 2 shows a top view of this apparatus.

Fig. 3, drawn to a larger scale, shows a view against the inner side of a portion of a profile element, viewed from the direction of the arrow of Fig. 2.

Fig. 4 shows a section taken on the line IV—IV of Fig. 3.

Fig. 5 drawn to a larger scale shows a section of a variation of the embodiment shown in Fig. 1.

Figure 1:
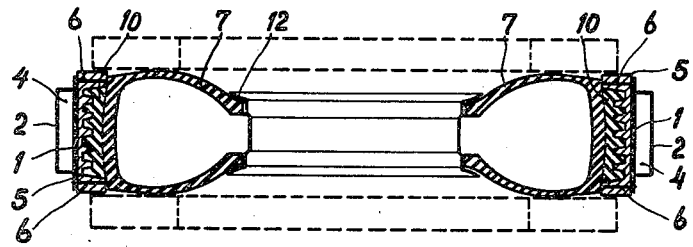
Figure 2:
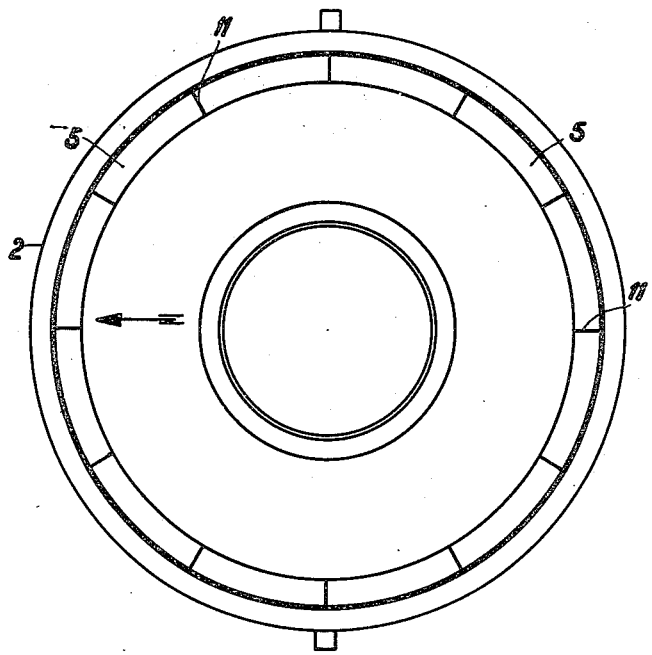
Figure 3:
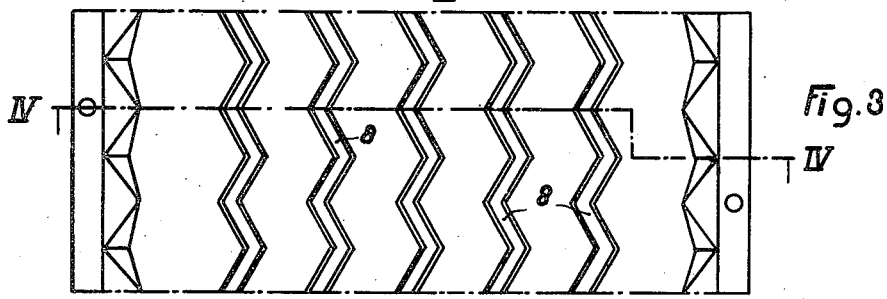
Figure 4:
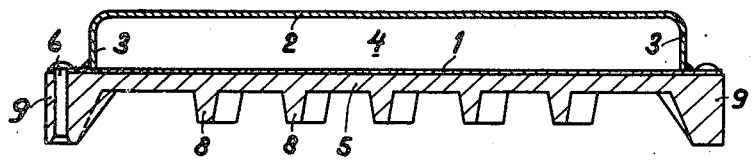

In the embodiment shown in Figs. 1-4, the heating chamber which is heated by means of steam, hot gases or electricity, consists of a bent thin annular plate 1, to which for example by welding, a similar annular plate 2, bent at its sides 3, is secured, so that a cross section shows a box shaped space 4, through which steam or hot gases may be led or in which electrical or other elements may be provided. The heat produced is transmitted to the ring shaped profiled segments 5, which are, for example, made of aluminum and with which the heating chamber 4 is connected by means of rivets 6. In this embodiment, twelve cast profiled segments 5 form a closed ring, two successive joint faces 11 enclosing an angle of 30°. The number of profiled segments may be varied. To provide sufficient escape of air, it is often found useful to apply more segments, for example, thirty.

The profiled segments are generally cast separately, but they may be made by casting a complete ring, which is then subdivided into sections. As may be seen from Fig. 1, the width of these profiles 5 corresponds to the largest width of the tire 7 which is to be vulcanized. In this embodiment, the profiling consists of longitudinal zig-zag profiles 8 which narrow towards the exterior (Figs. 3 and 4) to facilitate detaching from the mold after vulcanization. For the same reason, the raised sides 9 of the profiles 5 are inwardly profiled and during the vulcanizing process they prevent, as may be seen from Fig. 1, the plastic rubber from flowing away from the tire 7 and from the strip 10 which is to be vulcanized on to the tire. The sides 9, therefore, act as seals. By the indicated choice of profiles, the tire will be provided with an anti-slip surface, while the tread of the finished tire will have a neat appearance.

Instead of zigzag profiles, another anti-slip profile may be applied, for example, a rhombic or a star profile.

The air between the interior of the profiles 5 and the rubber strip 10, which tries to escape during the process, can easily find its way through the profiles and the partitions 11 (Fig. 2) of any two adjacent elements 5, and escape. In this way, an accurately finished tread will be obtained. After the rubber strip 10, which must be vulcanized on to the tire, and the heating chamber 4 with the profiles 5 provided at its circumference, have been fitted around the tire 7 and its rim 12, the whole group is clamped between an appropriate clamping device of known construction, so that a mutual shifting either in radial or tangential direction becomes impossible. In Fig. 1, the broken lines schematically indicate two clamping discs, which may be drawn toward each other in any desired manner.

Figure 5:
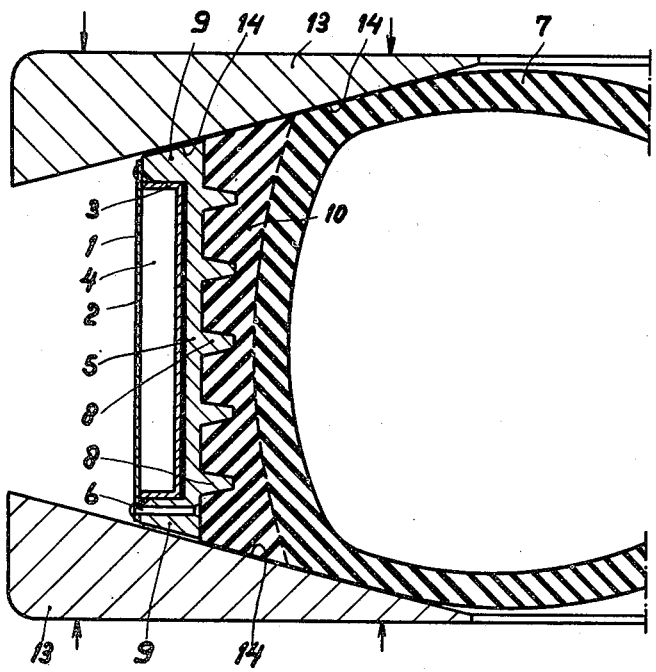
Figure 6:
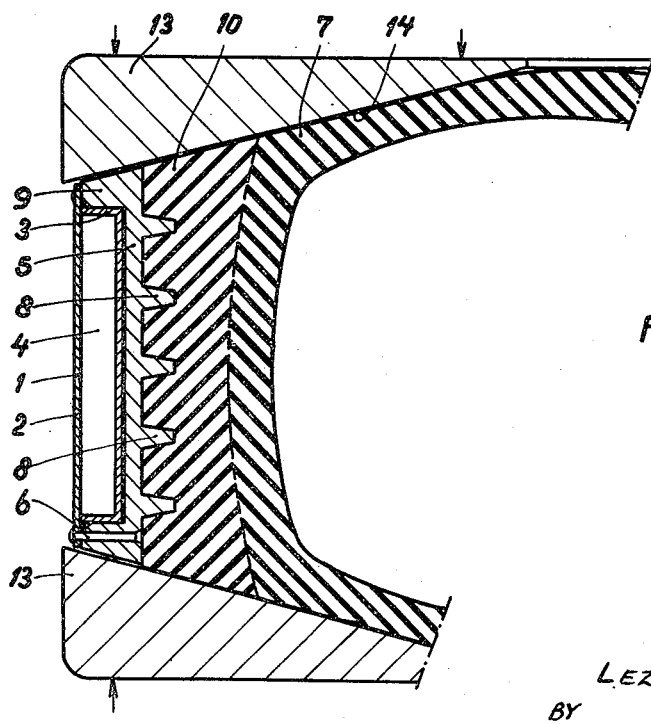
Fig. 6 shows a section corresponding to Fig. 5.

Figs. 5 and 6 show another embodiment. Here, the thin plate 2, which has bent edges 3, is welded to the inner circumference of the plate 1 which forms the outer ring. In this way a heating chamber 4 is formed. The profiled segments 5 have the same profiles 8 as those of Figs. 1–4, but the raised sides 9 are found on the outer circumference and the thus formed sides are secured to the heating chamber 4 by clamping or by means of rivets 6.

In order to make sure that the whole group is rigidly clamped by the clamping device and to prevent the flowing off of the plastic rubber at the sides during the vulcanizing process, clamping rings 13 are laid between the discs of the clamping device, as shown in Fig. 1.

To this end, the outer sides of the profiles 5 are sloped at 14, the inclination corresponding to the radial slope of the tire 7. The inner side of the clamping rings 13 is tapered in such a way, that the clamping rings rest against the tire to provide an effective clamping, but they do not prevent the escape of air between the profiled segments 5 and the plastic rubber 10. An appropriate dimensioning of the rings 13, which may, or may not, be subdivided, makes them adaptable for the retreading of big tires as well as small ones.

When comparing Figs. 5 and 6, we see, that in Fig. 6 the tire 7 is of larger dimensions than in Fig. 5. However, in both cases the strip 10 is vulcanized on to the tire by means of the same parts. The clamping rings 13 simply occupy in radial direction a more inwardly position relative to the heating chamber 4 and the profiled segments 5 so that the distance between them is enlarged and more space is available to receive the tire.

Instead of joining the plates 1 and 2 by means of the bent sides 3 of the latter, the heating chamber may also be formed in another way, for example, by using circular plates 1 and 2, between which plates circular metallic strips running along the edges of the plate 2 are placed, the two plates being welded onto these strips.

Figure 7:
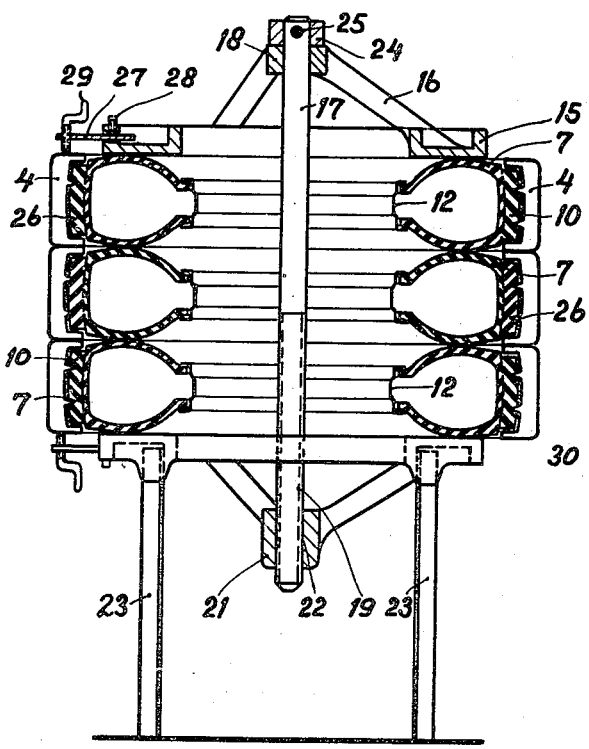
Fig. 7 is a section of an apparatus according to the invention, in which a plurality of tires can be vulcanized at the same time.
Figure 8:
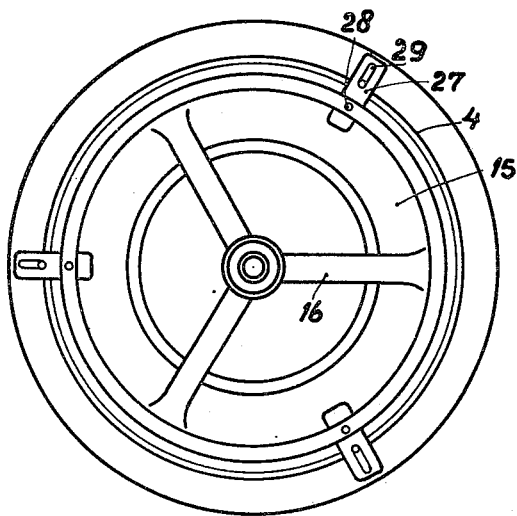
Fig. 8 shows a top view of this apparatus.

In Figures 7 and 8, 15 indicates a ring-shaped top disc reinforced by spokes 16. A long spindle 17 passes through the bore of the hub 18, which spindle is provided with screw thread 19 over a large portion of its lower end. The lower disc 20, which is almost symmetrical to the top disc 15, has a hub 21 with screw-thread 22, into which the spindle 17 can be screwed. The lower disc is fixed to legs 23 supporting the whole apparatus. A lock ring 24 is riveted to the spindle 17, while a hole 25 is bored through the ring 24 and the spindle 17, through which hole a rod may be inserted for screwing the spindle up or down. Although in the embodiment shown in these figures both discs are cast, a welded construction may, of course, be used.

Between the two clamping discs 15 and 20, the rubber tires 7, for example three tires, may be placed for retreading. The tires may have been pumped up to a certain pressure (the inner tube is not shown in the figure) or they may be provided only with rims 12 for stiffening. The rubber strips to be vulcanized to the tires are indicated by the numeral 10.

A number of ring-shaped heating chambers 4, provided with internal profiled forms 26, are laid upon one another and protected against rotary and radial motion. The steam pipe lines are not shown in the figure. The adjusting means for the molds consists of flat metal strips 27, slipped through and movable in recesses at the outer rims of the lower disc 20 and the top disc 15, which strips are fixed by means of locking bolts 28 fitted in the rims and are externally provided with threaded openings, through which the clamping bolts 29 are passed. These clamping bolts when tightened prevent any displacement of the heating chambers. In the present application three pairs of clamping bolts are provided. It will be evident that it is possible to use four or more pairs if desired.

The simultaneous treatment of more than one tire is accomplished by the present invention in a simple, inexpensive and efficient way.

I claim:

1. Apparatus for simultaneously retreading a plurality of rubber tires, comprising a plurality of annular heating chambers, a plurality of annular matrices each corresponding to one of the said heating chambers and each adapted to enclose a tire to be retreaded, the said matrices being provided with a tread design on their inner surfaces and being each divided along radial planes into a plurality of segments fixedly attached to the corresponding one of the said heating chambers along the inner circumference thereof and spaced with respect to each other at such a distance as to allow the air to escape from the matrices, a tire clamping device consisting of two horizontal annular discs and a vertical threaded spindle adapted to draw together the said discs and positioned in the center line thereof, the said spindle being of such length as to allow a plurality of tires lying directly one upon another to be interposed between the said discs when not drawn together, and a plurality of clamping means provided at the circumference of the said discs and adapted to clamp the said heating chambers together so as to prevent any displacement of the said heating chambers.

2. Apparatus as claimed in claim 1, wherein the upper one of the said discs is provided with a hub slidably mounted on said spindle and the said spindle is provided with a head resting on said hub in the clamping position of the spindle.

3. Apparatus as claimed in claim 2, wherein the lower one of the said discs is provided with a threaded hub enclosing the said spindle.

4. Apparatus for simultaneously retreading a plurality of rubber tires, comprising a plurality of annular heating chambers, a plurality of annular matrices each corresponding to one of the said heating chambers and each adapted to enclose a tire to be retreated, the said matrices being provided with a tread design on their inner surfaces and being each divided along radial planes into a plurality of segments fixedly attached to the corresponding one of the said heating chambers along the inner circumference thereof and spaced with respect to each other at such a distance as to allow the air to escape from the matrices, a tire clamping device consisting of two horizontal annular discs and a vertical threaded spindle adapted to draw together the said discs and positioned in the center line thereof, the said spindle being of such length as to allow a plurality of tires lying directly one upon another to be interposed between the said discs when not drawn together, a plurality of flat metal strips adapted to pass into radial recesses provided in the circumference of each of the said discs, a plurality of locking bolts for fixing the said strips each in one of the said recesses, and a plurality of threaded clamping bolts passing through threaded holes provided in the said strips outside the circumference of the said discs, the said clamping bolts resting on the outermost ones of the said heating chambers in their clamping position.

5. Apparatus for retreading rubber tires, comprising a continuous annular heating chamber having a substantially rectangular cross section and formed from a continuous circular strip of sheet metal and a continuous sheet metal channel member secured along its free edges thereto, said strip being of sufficient axial width to provide portions extending beyond the said channel member at each side thereof, an annular matrix formed from cast light metal, provided with a tread design on its inner surface and divided along radial planes into a plurality of segments each having raised edges on both sides of the tread design, and fastening means securing said segments to one side of said circular strip and passing through said raised edges and through the portions of said strip on both sides of said channel member.

6. Apparatus for retreading rubber tires, comprising a continuous annular heating chamber having a substantially rectangular cross section and formed from a continuous circular strip of sheet metal and a continuous sheet metal channel member secured along its free edges thereto, said strip being of sufficient axial width to provide portions extending beyond the said channel member at each side thereof, an annular matrix formed from cast aluminum, provided with a tread design on its inner surface and divided along radial planes into at least twelve segments each having raised edges on both sides of the tread design, and fastening means securing said segments to one side of said circular strip and passing through said raised edges and through the portions of said strip on both sides of said channel member.

7. Apparatus for retreading rubber tires, comprising a plurality of continuous annular heating chambers each having a substantially rectangular cross section and formed from a continuous circular strip of sheet metal and a continuous sheet metal channel member secured along its free edges thereto, said strip being of sufficient axial width to provide portions extending beyond the said channel member at each side thereof, a plurality of annular matrices formed from cast light metal, provided with a tread design on its inner surface and divided along radial planes into a plurality of segments each having raised edges on both sides of the tread design, and fastening means securing said segments to one side of the circular strip of each of said chambers and passing through said raised edges and through the portions of said strip on both sides of said channel members.

8. Apparatus for retreading rubber tires as defined in claim 5, wherein the distance between the outer diameter of the tread design portion of the matrix and the inner diameter of the heating chamber is less than the distance between the outer and inner diameters of the tread design.

LEZER HEYMAN COHEN.

REFERENCES CITED

The following references are of record in the file of this patent:

UNITED STATES PATENTS

| Number | Name | Date |
|---|---|---|
| 1,917,262 | Hawkinson | July 11, 1933 |
| 1,943,947 | Bungay | Jan. 16, 1934 |
| 2,024,888 | Shaw | Dec. 17, 1935 |
| 2,174,188 | Heintz | Sept. 26, 1939 |
| 2,235,292 | Glynn | Mar. 18, 1941 |
| 2,266,831 | Tegarty | Dec. 23, 1941 |
| 2,333,588 | Schaevitz | Nov. 2, 1943 |
| 2,429,786 | Wright | Oct. 28, 1947 |
| 2,440,321 | Bacon, Jr. | Apr. 27, 1948 |